Jan. 29, 1924.

N. W. AKIMOFF

BALANCING MACHINE

Filed April 26, 1918

1,481,785

Inventor
Nicholas W. Akimoff,
By Jas. C. Nobensmith
Attorney

Patented Jan. 29, 1924.

1,481,785

UNITED STATES PATENT OFFICE.

NICHOLAS W. AKIMOFF, OF PHILADELPHIA, PENNSYLVANIA, ASSIGNOR TO VIBRATION SPECIALTY COMPANY, OF PHILADELPHIA, PENNSYLVANIA, A CORPORATION OF DELAWARE.

BALANCING MACHINE.

Application filed April 26, 1918. Serial No. 231,017.

*To all whom it may concern:*

Be it known that I, NICHOLAS W. AKIMOFF, a citizen or subject of the constituted government of Russia, who has declared his intention of becoming a citizen of the United States, residing at Philadelphia, in the county of Philadelphia and State of Pennsylvania, have invented certain new and useful Improvements in Balancing Machines, of which the following is a specification.

My invention relates to balancing machines, and it has particular relation to a machine for determining, for the purpose of correction, the location and value of static and dynamic unbalance existing in rotatable machine elements.

The principal object of my present invention is to provide a novel and improved type of machine for testing rotatable machine elements to determine the location and value of static and dynamic unbalance existing therein. For the accomplishment of the foregoing object my invention contemplates the provision of a machine in which the machine elements to be tested may be mounted and rotated in suitable supporting devices of such construction and arrangement whereby the machine element being tested may be permitted to alternatively oscillate in what may be termed "two degrees of freedom," either of which may be suppressed at will, so that the machine element may be tested in a single machine for the ascertainment of the location and value of both static and dynamic unbalance, and which when permitted to oscillate simultaneously in both degrees of freedom will show whether or not all the proper corrections have been made for the elimination of such unbalance, both static and dynamic.

My invention further contemplates the provision of means whereby the moments of inertia of the oscillatory supporting devices may be arbitrarily varied for the purpose of better synchronizing the periods of oscillation of the oscillatory supporting devices with the speed of rotation of machine element to be tested to thereby accentuate the static or dynamic unbalance existing therein and thus facilitate the determination of the location and value thereof.

My invention further contemplates the provision of means for stabilizing or centrally locating the oscillatory supporting devices which means incidentally act to modify the respective periods of oscillation of said supporting devices, and which means are also provided with means for varying their respective tensions whereby the proper synchronizing of the respective periods of oscillation of said supporting devices will not be interfered with.

The nature and characteristic features of my invention will be more readily understood from the following description taken in connection with the accompanying drawings forming part hereof, in which.

Figure 1:
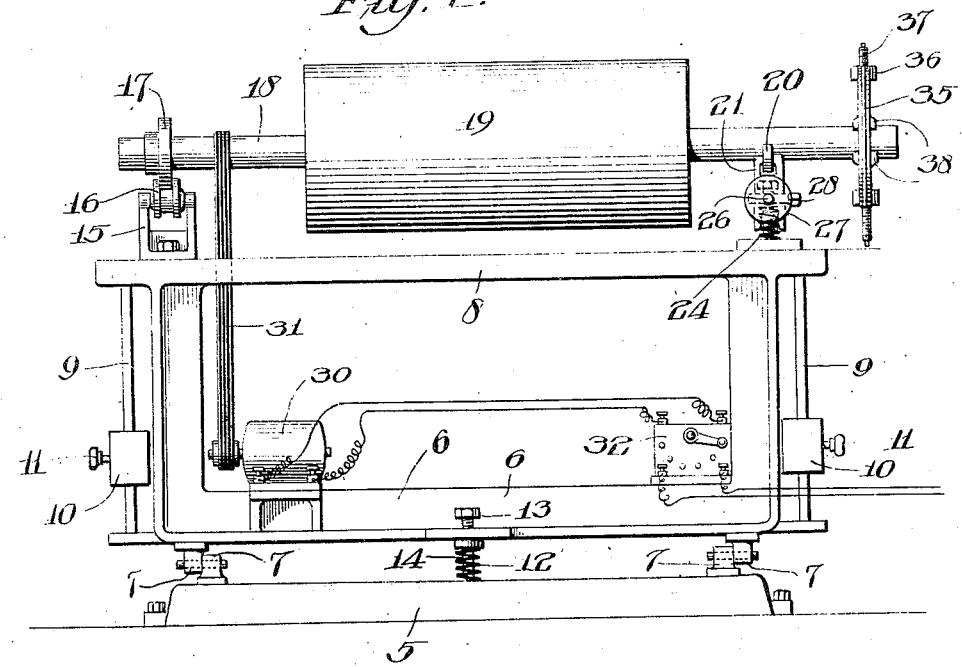
Figure 1 is a front elevation of a balancing machine embodying the main features of my present invention.
Figure 2:
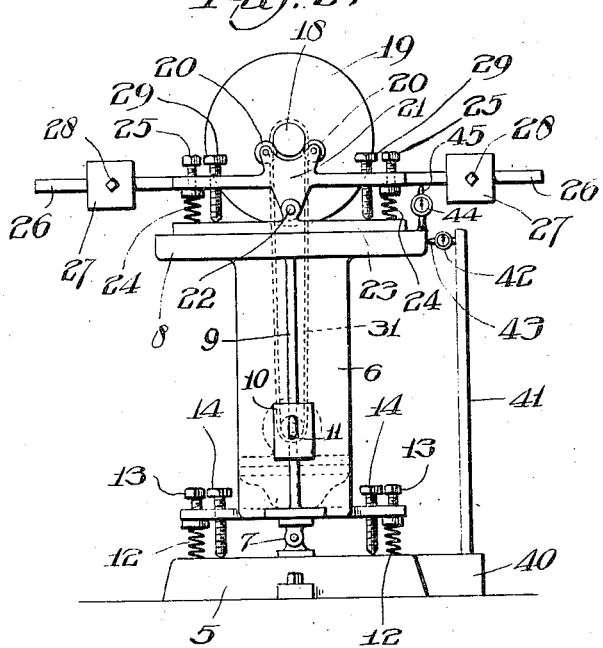
Fig. 2 is an end elevation thereof.

Referring to the drawings, in the particular embodiment of my invention therein shown, 5 is the stationery base of a machine upon which a frame work 6 is mounted in such manner as to be capable of periodic oscillation transversely to the axis of the machine element to be tested. The means of mounting the frame 6 with respect to the stationary base 5 may comprise hinges 7 interposed between the bottom of the frame 6 and the base 5. Other means of mounting the frame 6 in such manner as to permit the desired periodic oscillation of the same will readily occur to those skilled in the art.

The frame 6 is provided at the top with a table 8 upon which the devices for supporting the machine element to be tested may be secured.

The frame 6 is provided, for a purpose to be presently more fully explained, with means for varying the moment of inertia about the axis of oscillation of said frame and the parts carried thereby. The means for varying the moment of inertia as shown in the drawings comprises the provision, at each end of the frame 6, of a vertical rod 9, upon which a weight 10 is adjustably mounted, there being means provided such as the set screws 11 for securing the weight 10 at any desired location on the vertical rod 9.

On each side of the axis of oscillation there is provided a spring 12 which serves to stabilize or maintain the location of the frame 6 in a normal central position, and these springs 12 also incidentally modify the period of oscillation of said frame 6 about the axis thereof, The tension of the springs 12 may be altered at the will of the operator by means of adjusting screws 13, and there is thus provided one means for arbitrarily varying the period of oscillation of the frame 6 about its axis. There is also provided, on each side of the axis of oscillation of the table 6, a set screw 14 whereby the operator may lock the frame 6 against oscillation when desired.

Securely mounted on one end of the table 8 is a bearing structure 15 in which grooved rollers 16 are journalled which rollers serve as a bearing and support for a flange 17 which is mounted on one end of the shaft 18 of the machine element 19 which is to be tested for the determination of the location and value of static and dynamic unbalance existing therein. The other end of the shaft 18 of the machine element is supported on rollers 20 which are journalled in a frame 21 which is mounted on the top of the table 8 in such manner as to permit oscillatory movement of the end of the shaft 18 which is supported by the rollers 20. In the present instance this object is accomplished by pivotally connecting the frame 21 as at 22 with a base member 23 which is suitably secured on the top of the table 8. On each side of the axis of oscillation of the frame 21 there is provided a spring 24 which serves to stabilize or centrally locate the frame 21 and incidentally modifies the period of oscillation thereof, and the springs 24 are also provided with means for varying their tension which means may comprise the adjusting screws 25, so that the period of oscillation of the means for supporting the end of the shaft 18 may in this manner be arbitrarily varied under the control of the operator. The oscillatory frame 21 is also provided with means for varying the moment of inertia about its axis of oscillation. The means for varying the moment of inertia in the present instance comprises rods extending from each side of the frame 21 upon which rods 26 are mounted shiftable weights 27 which may be secured in any desired position by means of the set screws 28. The oscillatory frame 21 is also provided with set screws 29 which serve as a means for locking the frame 21 against oscillatory movement when desired.

Mounted on the frame 6 is an electric motor 30 which serves as a means for rotating the machine element 19 through belting 31 or other power transmission mechanism. The speed of the motor 30 is under the control of the operator by means of a rheostat 32 whereby the speed of rotation of the machine element being tested may be varied to synchronize the same with the period of oscillation of the particular portion of the supporting mechanism which is permitted to oscillate, accordingly as the operator desires to test for static or dynamic unbalance, as will be hereinafter more fully set forth.

Figure 4:
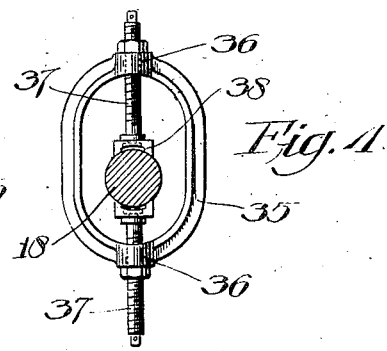
Fig. 4 is an elevational view of a "clamp" or device for creating a determinable counterbalancing centrifugal force for the purpose of overcoming the existing static and dynamic unbalance in the machine element to be tested.
Figure 3:
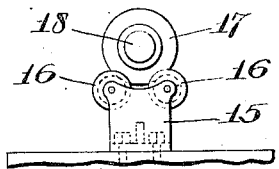
Fig. 3 is an end elevation of a portion of the supporting structure.

Any desired means of setting up a determinable centrifugal force may be mounted on the shaft 18, and a device for this purpose is shown in Fig. 4, which device there shown constitutes the subject matter of an application for Letters Patent previously filed by me on May 11, 1917, Serial No. 167,919. This device comprises an elliptical frame or yoke 35 which is symmetrical about each of its two axes at right angles to the axis of rotation. At each end of the frame 35 there is preferably provided a boss or lug 36 interiorly threaded for the mounting of oppositely disposed set screws 37. The set screws 37 are of the same shape and size and are each provided at their inner ends with saddle blocks 38 for engaging the surface of the shaft 18 upon which the appliance is mounted. All the parts of this device are accurately made, calibrated and balanced, so that when the appliance is centrally adjusted upon the shaft there will be no centrifugal effect when the shaft is rotated. By adjusting the set screws 37 the centre of gravity of the frame 35 may be thereby displaced to any desired distance from the center of the shaft 18 to thereby create a centrifugal force which will be in functional relationship to the mass of the frame 35, to the radius of displacement, and also to the rate of the angular speed. It will be readily understood that any other preferred form of apparatus may be employed if desired for creating a determinable centrifugal force for the purpose of temporarily counterbalancing the static or dynamic unbalance existing in the machine element under test.

For the purpose of indicating when the required standard of balance has been reached through the counterbalancing effect of the device above described there may be provided in connection with the machine any preferred form of device which will indicate the condition arrived at. For this purpose there may be employed the common type of dial gauges which are well known and in common use. These devices as shown may be arranged as follows:—The base 5 of the machine may be provided with an integral extension 40 in which is rigidly mounted an upwardly extending bar 41 which supports a dial gauge 42 at its upper end in proximity to a portion of the table 8. The feeler finger 43 of the dial gauge bears against the table 8 so that any oscillatory movement thereof will be shown by the indicating needle of the dial gauge 42. The table 8 also supports a dial gauge 44 the feeler finger 45 of which engages a portion of the oscillatory support 21 so as to indicate the extent of oscillation of the same.

The operation of the machine of my present invention will now be readily understood. The machine element 19 to be balanced has its shaft provided with a flange 17 which is suitably supported in the grooved rollers 16 which are journalled in the bracket 15 which is rigidly attached to the top of the table 8; and the other end of the shaft 18 of the machine element 19 is supported on the rollers 20 which are journalled in the oscillatory frame 21. The set screws 29 are now screwed down so that they each bear against the base member 23 which is secured to the top of the table 8, thus locking the oscillatory frame 21 against movement about its axis 22. The set screws 14 located at the bottom of the oscillatory frame 6 are retracted so as to permit the frame 6 to oscillate about its axis as provided by the hinges 7. The counterbalancing device shown in detail in Fig. 4 having previously been placed upon the end of the shaft 18, the motor 30 is then caused to operate and through the belt 31 the machine element 19 will be rotated. By successive trial in various positions both radially and as to offcenter displacement the counterbalancing device will finally be brought to a condition where the same will counteract any static unbalance existing in the machine element 19. The speed of rotation is varied by means of the rheostat 32 to approximate the speed of rotation of said machine element to that of the period of free oscillation of the frame 6 and the parts carried thereby. The shiftable weights 10 provide a means for varying the period of free oscillation of the frame 6 and the parts carried thereby by changing the moment of inertia of said table about the axis of oscillation. The springs 12 which serve to normally maintain the frame 6 in a central location may be varied in their tension by means of the screws 13 so as to adjust and synchronize the same to the desired period of free oscillation and thus facilitate the ready observation of the desired standard of unbalance, the same being indicated by the dial gauge 42.

After the angular location and extent of the static unbalance existing in the machine element under test has been indicated by observing the angular location of the counterbalancing device and also measuring the amount of offcenter adjustment thereof, the static unbalance can then be readily eliminated by the removal of the required quantity of material on the heavy side of the machine element or by the addition of a similar mass on the light side, whichever may be most convenient or permissible.

When the machine element has thus been brought to a condition of substantially perfect static balance, the machine element is again replaced in the machine and the set screws 14 are then screwed down against the base 5 to thus lock the frame 6 against oscillation and the set screws 29 carried by the oscillatory frame 21 are then retracted so as to permit the end of the shaft supported by the rollers 20 to oscillate laterally. The counterbalancing device is again placed in position on the end of the shaft 18 and the machine element under test is again rotated by means of the electric motor 30 in the same manner as before and the angular location and extent of the dynamic unbalance existing therein is then ascertained through successive trial and by angular and offcenter adjustment of the counterbalancing device. The moment of inertia of the oscillatory frame 21 and the parts carried thereby may be varied by shifting the weights 27 on their supporting rods 26, and the springs 24 which normally serve to locate the oscillatory frame 21 in a central position may be varied in their tension by means of the adjusting screws 25 so as to synchronize the period of free oscillation of the frame 21 and the parts carried thereby with the speed of rotation of the machine element under test. When the counterbalancing device is finally brought to a condition where the existing dynamic unbalance is substantially counteracted, the angular and longitudinal position of the same is observed, as well as the amount of offcenter displacement thereof, so that the operator may then determine the amount of material to be removed or added at proper and permissible places to eliminate said dynamic unbalance.

It will thus be noted that there is provided a machine in which the location and value of both static and dynamic unbalance existing in rotatable machine elements may be readily determined, and that said machine is characterized by the provision of suitable supporting devices which are so constructed and arranged that the machine element under test may be permitted to alternatively oscillate in two degrees of freedom, either of which may be suppressed at the will of the operator, and which is provided with means for completely synchronizing the period of free oscillation of the supporting devices and the parts carried thereby with the speed of rotation of the machine element being tested so that the accuracy of the determination will be insured.

Having thus described the nature and characteristic features of my invention, what I claim as new and desire to secure by Letters Patent is;

1. In a machine for determining the location and value of static and dynamic unbalance existing in a rotatable machine element, means for rotatably supporting said machine element whereby the same may be permitted to oscillate in two degrees of freedom, means for alternatively suppressing the oscillation in either degree at will, and means for arbitrarily creating a determinable centrifugal force for counterbalancing the static or dynamic unbalance existing in said machine element.

2. In a machine for determining the location and value of static and dynamic unbalance existing in a rotatable machine element, means for rotatably supporting said machine element whereby the same may be permitted to oscillate in two degrees of freedom, means for alternatively suppressing the oscillation in either degree, and means adapted to be shiftably mounted on a portion of said machine element for arbitrarily creating a determinable centrifugal force for counterbalancing the static or dynamic unbalance existing in said machine element.

3. In a machine for determining the location and value of static and dynamic unbalance existing in a rotatable machine element, means for rotatably supporting said machine element whereby the same may be permitted to oscillate in two degrees of freedom, means for alternatively suppressing the oscillation in either degree at will, means for arbitrarily creating a determinable centrifugal force for counterbalancing the static or dynamic unbalance existing in said machine element, and means for rotating the machine element at variable speeds.

4. In a machine for determining the location and value of static and dynamic unbalance existing in a rotatable machine element, means for rotatably supporting said machine element whereby the same may be permitted to oscillate in two degrees of freedom, means for alternatively suppressing the oscillation in either degree at will, means for arbitrarily creating a determinable centrifugal force for counterbalancing the static or dynamic unbalance existing in said machine element, means for rotating the machine element at variable speeds, and means for synchronizing the period of oscillation in each degree of freedom with the speed of rotation of said machine element.

5. In a machine for determining the location and value of static and dynamic unbalance existing in a rotatable machine element, means for rotatably supporting said machine element whereby the same may be permitted to oscillate in two degrees of freedom, means for alternatively suppressing the oscillation in either degree at will, means adapted to be shiftably mounted on a portion of said machine element for arbitrarily creating a determinable centrifugal force for counterbalancing the static or dynamic unbalance existing in said machine element, and means for rotating the machine element at variable speeds.

6. In a machine for determining the location and value of static and dynamic unbalance existing in a rotatable machine element, means for rotatably supporting said machine element whereby the same may be permitted to oscillate in two degrees of freedom, means for suppressing the oscillation in either degree at will, means adapted to be shiftably mounted on a portion of said machine element for arbitrarily creating a determinable centrifugal force for counterbalancing the static or dynamic unbalance existing in said machine element, means for rotating the machine element at variable speeds, and means for synchronizing the period of oscillation in each degree of freedom with the speed of rotation of said machine element.

7. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily locking the frame against oscillation, means for arbitrarily locking the oscillatory supporting device carried thereby against oscillation, and means adapted to be mounted on the rotatable machine element for arbitrarily creating a determinable centrifugal force for counterbalancing the static or dynamic unbalance existing in said machine element.

8. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily locking the frame against oscillation, means for arbitrarily locking the oscillatory supporting device carried thereby against oscillation, means adapted to be mounted on the rotatable machine element for arbitrarily creating a determinable centrifugal force for counterbalancng the static or dynamic unbalance existing in said machine element, and means for rotating the machine element at variable speeds.

9. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily locking the frame against oscillation, means for arbitrarily locking the oscillatory supporting device carried thereby against oscillation, means adapted to be mounted on the rotatable machine element for arbitrarily creating a determinable centrifugal force for counterbalancing the static or dynamic unbalance existing in said machine element, means for rotating the machine element at variable speeds, means for synchronizing the period of oscillation of the frame with the speed of rotation of the machine element, and means for synchronizing the period of oscillation of the oscillatory supporting device carried by said frame with the speed of rotation of the machine element.

10. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily locking the frame against oscillation, means for arbitrarily locking the oscillatory supporting device carried thereby against oscillation, means for arbitrarily varying the moment of inertia of said frame and the parts carried thereby, means for arbitrarily varying the moment of inertia of the supporting devices carried by said frame, and means adapted to be mounted on the rotatable machine element for arbitrarily creating a determinable centrifugal force for counterbalancing the static or dynamic unbalance existing in said machine element.

11. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily locking the frame against oscillation, means for arbitrarily locking the oscillatory supporting device carried thereby against oscillation, means for arbitrarily varying the moment of inertia of said frame and the parts carried thereby, means for arbitrarily varying the moment of inertia of the supporting devices carried by said frame, means adapted to be mounted on the rotatable machine element for arbitrarily creating a determinable centrifugal force for counterbalancing the static or dynamic unbalance existing in said machine element, and means for rotating the machine element at variable speeds.

12. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily locking the frame against oscillation, means for arbitrarily locking the oscillatory supporting device carried thereby against oscillation, means for arbitrarily varying the moment of inertia of said frame and the parts carried thereby, means for arbitrarily varying the moment of inertia of the supporting devices carried by said frame, means for arbitrarily creating a determinable centrifugal force for counterbalancing the static or dynamic unbalance existing in said machine element, and means for rotating the machine element at variable speeds.

13. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily locking the frame against oscillation, means for arbitrarily locking the oscillatory supporting device carried thereby against oscillation, means for arbitrarily varying the moment of inertia of said frame and the parts carried thereby, means for arbitrarily varying the moment of inertia of the supporting devices carried by said frame, and means for arbitrarily creating a determinable centrifugal force for counterbalancing the static or dynamic unbalance existing in said machine element.

14. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily creating a determinable centrifugal force for counterbalancing the static or dynamic unbalance existing in said machine element, means for rotating the machine element at variable speeds, springs for stabilizing the oscillatory frame in a normal central position, means for varying the tension of said springs, springs for stabilizing the oscillatory supporting device carried by the frame in a normal central position, and means for varying the tension of said springs.

15. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily creating a determinable centrifugal force for counterbalancing the static or dynamic unbalance existing in said machine element, means for rotating the machine element at variable speeds, means for synchronizing the period of oscillation of the frame with the speed of rotation of the machine element, means for synchronizing the period of oscillation of the oscillatory supporting device carried by said frame with the speed of rotation of the machine element, springs for stabilizing the oscillatory frame in a normal central position, means for varying the tension of said springs, springs for stabilizing the oscillatory supporting device carried by the frame in a normal central position, and means for varying the tension of said springs.

16. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means adapted to be mounted on the rotatable machine element for arbitrarily creating a determinable centrifugal force for counterbalancing the static or dynamic unbalance existing in said machine element, means for rotating the machine element at variable speeds, means for synchronizing the period of oscillation of the frame with the speed of rotation of the machine element, means for synchronizing the period of oscillation of the oscillatory supporting device carried by said frame with the speed of rotation of the machine element, springs for stabilizing the oscillatory frame in a normal central position, means for varying the tension of said springs, springs for stabilizing the oscillatory supporting device carried by the frame in a normal central position, and means for varying the tension of said springs.

17. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily locking the frame against oscillation, means for arbitrarily locking the oscillatory supporting device carried thereby against oscillation, means adapted to be mounted on the rotatable machine element for arbitrarily creating a determinable centrifugal force for counterbalancing the static or dynamic unbalance existing in said machine element, means for rotating the machine element at variable speeds, means for synchronizing the period of oscillation of the frame with the speed of rotation of the machine element, means for synchronizing the period of oscillation of the oscillatory supporting device carried by said frame with the speed of rotation of the machine element, springs for stabilizing the oscillatory frame in a normal central position, means for varying the tension of said springs, springs for stabilizing the oscillatory supporting device carried by the frame in a normal central position, and means for varying the tension of said springs.

18. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily locking the frame against oscillation, means for arbitrarily locking the oscillatory supporting device carried thereby against oscillation, means for arbitrarily creating a determinable centrifugal force for counterbalancing the static or dynamic unbalance existing in said machine element, means for rotating the machine element at variable speeds, means for synchronizing the period of oscillation of the frame with the speed of rotation of the machine element, means for synchronizing the period of oscillation of the oscillatory supporting device carried by said frame with the speed of rotation of the machine element, springs for stabilizing the oscillatory frame in a normal central position, means for varying the tension of said springs, springs for stabilizing the oscillatory supporting device carried by the frame in a normal central position, and means for varying the tension of said springs.

19. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily locking the frame against oscillation, means for arbitrarily locking the oscillatory supporting device carried thereby against oscillation, means for arbitrarily varying the moment of inertia of said frame and the parts carried thereby, means for arbitrarily varying the moment of inertia of the oscillatory supporting device carried by said frame, means for arbitrarily creating a determinable centrifugal force for counterbalancing the static or dynamic unbalance existing in said machine element, means for rotating the machine element at variable speeds, springs for stabilizing the oscillatory frame in a normal central position, means for varying the tension of said springs, springs for stabilizing the oscillatory supporting device carried by the frame in a normal central position, and means for varying the tension of said springs.

20. A balancing machine for determining the location and value of static and dynamic unbalance existing in a rotatable machine element comprising a stationary base, an oscillatory frame mounted thereon, devices mounted upon said frame for rotatably supporting each end of said machine element, one of said devices being rigidly connected to said frame and the other of said supporting devices being capable of oscillation with respect thereto, means for arbitrarily locking the frame against oscillation, means for arbitrarily locking the oscillatory supporting device carried thereby against oscillation, means for arbitrarily varying the moment of inertia of said frame and the parts carried thereby, means for arbitrarily varying the moment of inertia of the oscillatory supporting device carried by said frame, means adapted to be mounted on the rotatable machine element for arbitrarily creating a determinable centrifugal force for counterbalancing the static or dynamic unbalance existing in said machine element, means for rotating the machine element at variable speeds, springs for stabilizing the oscillatory frame in a normal central position, means for varying the tension of said springs, springs for stabilizing the oscillatory supporting devices carried by the frame in a normal central position, and means for varying the tension of said springs.

21. A balancing machine, comprising an oscillatory member, a pivot mounting for said member operative to restrain said member to oscillate in a single plane, a support for a body to be tested carried by said member, a pivot connection between said support and said member operative to restrain said support to oscillate in a single plane with respect to said member and at an angle with said first plane, so that said support possesses two degrees of freedom, and means to prevent the oscillation of either of said member, or said support with respect to said member, selectively or simultaneously.

22. A balancing machine, comprising a base, a member pivotally carried by said base and limited to one degree of freedom, a support for a body to be tested pivotally carried by said member and limited to one degree of freedom with respect to said member, means to rotate a body carried by said support, thus giving said support two degrees of freedom, and means to restrain the movement of said support to either one of said degrees of freedom.

In testimony whereof I have hereunto signed my name.

NICHOLAS W. AKIMOFF.